Figure 1:
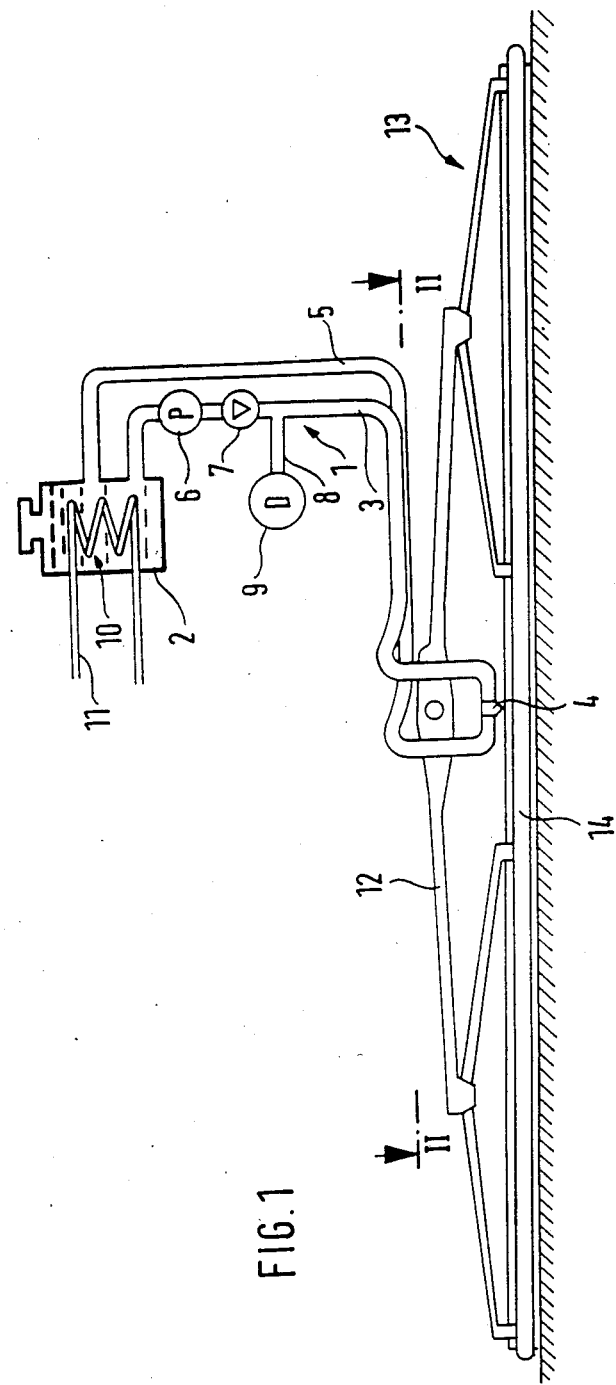

United States Patent [19]

Hagen

[11] Patent Number: 4,700,424
[45] Date of Patent: Oct. 20, 1987

[54] WINDSHIELD WASHING SYSTEM FOR MOTOR VEHICLES

[75] Inventor: Hans Hagen, Munich, Fed. Rep. of Germany

[73] Assignee: Bayerische Motoren Werke Aktiengesellschaft, Fed. Rep. of Germany

[21] Appl. No.: 847,262

[22] Filed: Apr. 2, 1986

[30] Foreign Application Priority Data

Apr. 3, 1985 [DE] Fed. Rep. of Germany ....... 3512108

[51] Int. Cl.$^4$ ............................................. B60S 1/48
[52] U.S. Cl. ............................... 15/250.04; 15/250.05; 15/205.07; 239/284.1; 239/126; 239/130
[58] Field of Search ........... 15/250.01, 250.04, 250.06, 15/250.07, 250.08, 250.09; 239/75, 124, 126, 125, 135, 130, 284 R, 284 A, 284.1, 284.2

[56] References Cited

U.S. PATENT DOCUMENTS 3,790,083  2/1974  Redifer ..................... 15/250.04 X
4,090,668  5/1978  Kochenour ............... 15/250.05 X

FOREIGN PATENT DOCUMENTS 2360601  6/1975  Fed. Rep. of Germany ... 239/284.2
1460494 10/1966  France ............................ 239/284.1
  53549  3/1983  Japan ............................... 15/250.05
 177754 10/1983  Japan ............................... 15/250.04

Primary Examiner—Peter Feldman

[57] ABSTRACT

In a windshield washing system for motor vehicles which includes a line for the supply of heated washing liquid to a spray nozzle, the line is part of a closed circulatory system which extends from a heating device in a reservoir tank to the spray nozzle in back and in which a pressure producer in case of need acts upon the washing liquid with an increased spray pressure, at which the spray nozzle releases washing liquid onto the surface to be cleaned.

11 Claims, 2 Drawing Figures

WINDSHIELD WASHING SYSTEM FOR MOTOR VEHICLES

The present invention relates to a windshield washing system for motor vehicles, with a line arranged between a reservoir tank and a spray nozzle for supplying washing liquid which is heated by means of a heating device.

In order to prevent freezing of the washing liquid it is known to heat the same externally. The heating device may thereby operate electrically (DE-OS No. 31 24 112) or by means of warm air (DE-OS No. 15 55 537). It is further known to heat the washing liquid remote from the spray nozzle by a heat exchanger whereby, for example, the cooling medium (DE-AS No. 12 32 491) respectively the exhaust gases (U.S. Pat. No. 2,576,198) of the vehicle engine serve as heat carrier for the heat exchanger. With the two former constructions problems exist as regards the control respectively the regulation of the heat supply because the function must be fulfilled without overheating the washing liquid. With the two latter constructions, weighty problems exist insofar as the washing liquid is heated relatively far away from the spray nozzle and the nozzle is thereby practically without heat supply especially with an exposed position. The great danger exists that the washing liquid freezes precisely in the area of the spray nozzle.

The present invention is concerned with the task to provide a windshield washing installation of the aforementioned type which with small expenditure attains a maximum degree in operating reliability also with an exposed position of the spray nozzle.

The underlying problems are solved according to the present invention in that the line is a part of a closed circulatory system which extends from the spray nozzle by way of a return line back to the reservoir tank, in that a pressure producer acts upon the washing liquid with an increased spray pressure in case of need and in that the spray nozzle permits washing liquid to leave only in the presence of the spray pressure.

It is achieved by the circulatory system that even the area of the spray nozzle is always supplied with heat by the circulating washing liquid and therefore can no longer freeze up even under extreme conditions. A control which is known already for the cooling medium of the vehicle engine may possibly be provided, by means of which the washing liquid is held at a uniform temperature. Thus, sufficient temperature controlled washing liquid is always available at the spray nozzle which reaches the surface to be cleaned when the spray pressure occurs.

It is known (DE-GM No. 84 14 681) to equip the vehicle windshield wiper with a de-icing device in the form of a circulatory system for warm water as heating medium. the windshield wiper is heated thereby. However, a washing sysytew is not provided. With this prior art arrangement, it is therefore possible only to preclude a freezing-up of the windshield wiper in its rest position.

A windshield washing installation is disclosed in the DE-OS 18 14 686 in which a spray nozzle is closed with a non-actuated washing installation and which opens under the influence of the pressure in the washing liquid. In contrast thereto the spray nozzle used with the present invention differs by a stepped behavior. With an inoperable pressure producer a system pressure prevails in the circulatory system at which the spray nozzle is closed. Only when the pressure producer produces the spray pressure, the spray nozzle opens and applies washing liquid onto the surface to be cleaned.

The washing liquid may circulate in the circulatory system by reason of different causes. Thus, one cause may be the thermosiphon-flow as is used for this purpose also in heating systems of buildings. In comparison therewith an improvement of the control of the washing liquid quantity circulated in the circulatory system results with the assistance of a pump which supplies the washing liquid with a system pressure below the spray pressure.

A further improvement has as its object to limit the use of the invention to those cases which are meaningful. For that purpose the heating installations, possible also the pump, is turned on only at a temperature of the washing liquid near its freezing point. This temperature is determined appropriately within the area of the spray nozzle.

With a windshield washing system which is combined with a customary windshield wiper, the circulatory system may extend partly in the arm of the windshield wiper and the spray nozzle may also be located within this area. An improved wetting of the surface is achieved therewith. Precisely with such an arrangement the present invention offers considerable advantages because in that case not only the spray nozzle but even a part of the feed line is exposed and loses considerably in heat insofar as this heat is not itself resupplied as with the present invention by the washing liquid.

Figure 2:
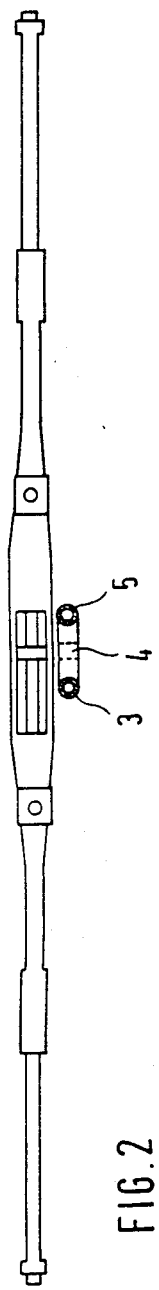

These and other objects, features and advantages of the present invention will become more apparent from the following description when taken in connection with the accompanying drawings which show, for purposes of illustration only, one embodiment in accordance with the present invention, and wherein:

FIG. 1 is a somewhat schematic side view of a windshield washing installation in accordance with the present invention; and FIG. 2 is a cross-sectional view taken along line II—II of FIG. 1.

Referring now to the drawing wherein like reference numerals are used throughout the two views to designate like parts, the windshield washing installation illustrated in the drawing includes a circulatory system generally designated by reference numeral 1 which extends from a reservoir tank 2 by way of a feed line 3 to at least one spray nozzle 4 and from the latter back to the reservoir tank 2 by way of a return line 5. A pump 6 and a check valve 7 are disposed in the line 3. Furthermore, a pressure producer 9 is connected by way of a connecting nipple 8. The reservoir tank 2 includes a heating device 10 in the form of a line 11 which is connected to the return of a cooling medium circulatory system (not shown in detail) of an internal combustion engine.

The line 3 and the return line 5 are secured at a spring clip 12 of a wiper arm 13. The spray nozzle 4 is directed onto the wiper blade 14, which is secured at the spring clip 12, adn there with against the surface of the windshield to be cleaned. Its operation is such that it opens only at a predetermined spray pressure and therewith permits washing liquid to leave only then. The line 3 and the return line 5 extend along the wiper arm and are displaced in the rest position (not shown) of the windshield wiper blade 14.

If the surface to be cleaned is to be wetted with washing liquid, then the pressure producer 9 is controlled, for example, by way of the usual washing actuator of a steering column switch for the windshield cleaning system. The washing liquid in the line 3 is therewith acted upon with a spray pressure which lies clearly above the system pressure produced by the pump 6. The correspondingly constructed wash nozzle 4 opens and then sprays washing liquid onto the surface to be cleaned. The check valve 7 thereby prevents that washing liquid reaches directly into the reservoir tank 2 by way of the pump 6. A throttle (not shown) in the return line 5 prevents that the reservoir tank 2 is acted upon with pressure.

The washing liquid is preheated by the heating device 10 and is at a temperature which lies markedly above the freezing point. As a result of the continuous circulation of the washing liquid in the circulatory system 1 it is assured that the washing liquid within the entire circulatory system is then also at a temperature above the freezing point. The spray nozzle 4 is therewith circum-circulated constantly with heated washing water and is at all times in a position to apply in case of need washing liquid to the surface to be cleaned.

By the additional displacement of the lines 3 and 5 within the storage or rest area of the wiper blade 14, it is further achieved that the wiper blade 14 can always move out of this storage or rest area, i.e. also at low temperatures, and is able to clean the respective surface. The operating reliability of the entire cleaning system incuding the washing system is therewith assured also at extremely low temperatures.

Insofar as the outside temperatures lie clearly above the freezing point, the pump 5 and the heating device 10 can be turned off by a corresponding control. The outside temperature can be determined, for example, with the aid of a temperature sensor which is already present anyhow, for example, in an air conditioning system. In the alternative thereto the temperature sensor may also determine the temperature of the washing liquid itself. For that purpose it may be arranged, for example, in the line 3 near the spray nozzle 4.

The function of the pressure producer 9 can also be produced by the pump 6. For that purpose the latter can operate with two velocities. At the lower velocity only the system pressure is produced whereas at the higher velocity the spray pressure is produced.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A pressurized windshield washing installation for motor vehicles, comprising a reservoir tank, pressure responsive spray nozzle means, line means arranged between the reservoir tank and the spray nozzle means for supplying pressurized washing liquid, heating means for heating the washing liquid, said line means forming part of a closed circulatory system for the pressurized washing liquid that extends from the spray nozzle means by way of a return line back to the reservoir tank, selectively controlled pressure producing means acting upon the pressurized washing liquid to increase the pressure of the pressurized washing liquid and the pressure responsive spray nozzle means being responsive to the increased pressure caused by the pressure responsive means to permit washing liquid to leave the closed circuit only when the pressurized washing liquid is acted upon by the selectively controlled pressure producing means.

2. An installation according to claim 1, wherein the closed circulatory system includes a pump means for supplying the pressurized washing liquid with a system pressure which is markedly below the increased pressure obtained by the pressure producing means.

3. An installation according to claim 2, wherein there is an actuating means for the heating means for turning on the heating means only at a temperature of the washing liquid near the freezing point.

4. An installation according to claim 2, wherein there is an actuating means for the heating means and the pump means for turning on the heating and pump means only at a temperature of the washing liquid near the freezing point.

5. An installation according to claim 4, wherein said line means and said return line as well as the spray nozzle means are secured at a wiper arm.

6. An installation according to claim 5, wherein the spray nozzle means is directed onto a wiper blade secured at the wiper arm.

7. An installation according to claim 1, wherein there is an actuating means for the heating means for turning on the heating means only at a temperature of the washing liquid near the freezing point.

8. An installation according to claim 1, wherein there is an actuating means for the heating means and the pump means for turning on the heating and pump means only at a temperature of the washing liquid near the freezing point.

9. An installation according to claim 1, wherein said line means and said return line as well as the spray nozzle means are secured at a wiper arm.

10. An installation according to claim 9, wherein the spray nozzle means is directed onto a wiper blade secured at the wiper arm.

11. An installation according to claim 9, wherein there is an actuating means for the heating means for turning on the heating means only at a temperature of the washing liquid near the freezing point.

* * * * *